(12) United States Patent
Athey

(10) Patent No.: US 6,753,047 B1
(45) Date of Patent: Jun. 22, 2004

(54) ELECTRODES FOR LIQUID CRYSTAL CELLS

(75) Inventor: Patricia Ruzakowski Athey, Pittsburgh, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 294 days.

(21) Appl. No.: 09/589,469

(22) Filed: Jun. 7, 2000

Related U.S. Application Data

(60) Provisional application No. 60/138,481, filed on Jun. 10, 1999.

(51) Int. Cl.[7] .................... G02F 1/1337; G02F 1/1343
(52) U.S. Cl. .................. 428/1.21; 428/1.15; 428/1.62; 349/139; 359/580; 257/4
(58) Field of Search ............................ 428/1.21, 1.5, 428/1.51, 1.62, 432, 472, 701, 702, 697, 689; 349/139, 147; 359/359, 360, 580, 589

(56) References Cited

U.S. PATENT DOCUMENTS

| | | | |
|---|---|---|---|
| 3,900,248 A | * 8/1975 | Nagasaki | 349/81 |
| 3,955,881 A | 5/1976 | Yaguchi et al. | 350/160 |
| 4,028,118 A | 6/1977 | Nakasuji et al. | 106/21 |
| 4,530,889 A | 8/1985 | Duffer et al. | 428/326 |
| 4,584,206 A | 4/1986 | Sleighter | 427/109 |
| 4,732,810 A | 3/1988 | Kito et al. | 428/402.2 |
| 4,749,261 A | 6/1988 | McLaughlin et al. | 350/339 R |
| 4,900,100 A | 2/1990 | Higashimata et al. | 303/100 |
| 5,172,256 A | 12/1992 | Sethofer et al. | 359/77 |
| 5,356,178 A | 10/1994 | Numata | 280/777 |
| 5,356,718 A | 10/1994 | Athey et al. | 428/428 |
| 5,477,358 A | 12/1995 | Rosenblatt et al. | 359/77 |
| 5,508,091 A | * 4/1996 | Austin | 428/216 |
| 5,618,390 A | 4/1997 | Yu et al. | 204/192.26 |
| 5,667,853 A | * 9/1997 | Fukuyoshi et al. | 428/1 |
| 5,821,001 A | 10/1998 | Arbab et al. | 428/623 |
| 5,828,432 A | 10/1998 | Shashidhar et al. | 349/139 |
| 6,039,390 A | 3/2000 | Agrawal et al. | 296/211 |

FOREIGN PATENT DOCUMENTS

| | | |
|---|---|---|
| EP | 0 374 865 | 6/1990 |
| WO | 99/05564 | 2/1999 |

OTHER PUBLICATIONS

Proscia, James et al., "Properties of fluorine–doped tin oxide produced by atmospheric pressure chemical vapor deposition from tetramethyltin, bromotrifluoromethane and oxygen", *Thin Solid Films 214* (*1992*), pp. 175–187.

F. Gharadjedaghi, "A Positive Contrast Guest–Host Display Using a Liquid Crystal of Negative Dielectric Anisotropy", 1981 vol. 68, Mol. Cryst. Liq. Cryst., pp 127–135.

Kirk Othmer Encyclopedia of Chemical Technology, vol. 8, pp. 652–661 (4th ed. 1993).

Y. B. Kim et al., "Rubbed Polyimide Films Studied by Scanning Force Microscopy", Applied Physics Letter 66 (17), Apr. 24, 1995.

M. O'Neill et al., "Photoinduced Surface Alignment for Liquid Crystal Displays", J. Phys. D: Appl. Phys. 33 (2000) R67–R84.

* cited by examiner

*Primary Examiner*—Harold Pyon
*Assistant Examiner*—Sow-Fun Hon
(74) *Attorney, Agent, or Firm*—Jacques B. Miles

(57) ABSTRACT

Electrodes for liquid crystal cells include a substrate e.g. glass having a conductive and alignment coating e.g. a fluorine doped tin oxide coating. After a conductive coating is deposited on the substrate the surface is cleaned and wiped unidirectionally with a solvent saturated cloth for a predetermined number of times. The electrode prepared in the above manner eliminates the need for the polyimide layer over a conductive coating and heat treatment of the polyimide layer.

17 Claims, 2 Drawing Sheets

ELECTRODES FOR LIQUID CRYSTAL CELLS

RELATED APPLICATIONS

This application claims the benefit of the filing date of Provisional Application Serial No. 60/138,481 filed Jun. 10, 1999, in the name of Patricia Ruzakowski Athey.

BACKGROUND OF THE INVENTION

1. Field of the Invention

This invention relates to liquid crystal cells, and more particularly, to electrodes for use in liquid crystal cells.

2. Discussion of the Presently Available Technology

Electrodes for liquid crystal cells are presently prepared by depositing a conductive film or coating, usually indium tin oxide ("ITO") film onto a surface of a pair of substrates, e.g. two pieces of glass. A liquefied polyimide is spin-coated onto the ITO surface and heat-treated to provide a polyimide coating on the ITO coating. Thereafter the surface of the polyimide layer of each of the electrodes is rubbed in the same direction with a felt cloth. Although the rubbing mechanism is not completely understood, the rubbing of the surface of the polyimide layers with a felt cloth is practiced to orient the longitudinal axis of liquid crystals in a liquid mixture contained between the electrodes in a preferred orientation. More particularly, when the liquid crystals are aligned parallel to the substrate surface and unidirectional with respect to each other there is homogeneous alignment. When the liquid crystals are aligned perpendicular to the substrate surface there is homeotropic alignment. A discussion regarding the polyimide layers is found in the letter entitled RUBBED POLYIMIDE FILMS STUDIED BY SCANNING FORCE MICROSCOPY by Y. B. Kinn, H. Olin, S. Y. Park, J. W. Choi, L. Komito, M. Matusyzyh and S. T. Lngewell published in Applied Physics Letter 66(17), Apr. 24, 1995.

Liquid crystal cells are presently fabricated by suspending fiber glass and/or polymer beads in an alcohol and spin-coating the alcohol-spacer mixture onto one of the electrodes. The electrodes are mounted with the polyimide surfaces facing one another with the direction of rubbing opposite to one another. The electrodes are maintained in spaced relationship by the spacers. One pair of opposite sides of the electrodes is sealed to provide a compartment between the rubbed surfaces of the polyimide layers. The compartment is heated to a temperature above the isotropic temperature of the liquid crystal e.g. about 90° C. and is capillary filled with a heated mixture containing a nematic liquid crystal which may also include a chiral nematic liquid crystal or a chiral component ("liquid mixture"). The liquid mixture may also include a dichroic dye which provides a guest-host liquid crystal cell. The liquid mixture is preferably heated above the isotropic temperature of the liquid crystal mixture. The article entitled "A POSITIVE CONTRAST GUEST-HOST DISPLAY USING A LIQUID CRYSTAL OF NEGATIVE DIELECTRIC ANISOTROPY" by F. Gharadjedaghi appearing in the 1981 Vol. 68 of the Mol. Cryst. Liq. Cryst. on pages 127≅135 discusses liquid mixtures. After the compartment is capillary filled with the liquid mixture, the remaining open sides are sealed.

An AC voltage applied across the two electrode changes the position of the longitudinal axis of the liquid crystals in the liquid mixture with respect to the electrode surfaces. For example, applying an AC voltage across the electrodes orients the longitudinal axis of the liquid crystals e.g. with liquid crystals having a positive dielectric anisotropy the applied voltage will align the long axis of the liquid crystals parallel to the applied field and with liquid crystals having a negative dielectric anisotropy the applied field will align the long axis of the liquid crystal perpendicular and/or away from the applied field. The dichroic dyes can have positive or negative dichroic ratios. Dichroic dyes having a positive dichroic ratio absorb more light along the long axis of the molecule and vice versa. In the case of a guest-host nematic liquid crystal cell, applying an AC voltage across the electrodes orients the liquid crystals (positive dielectric anisotropy) parallel to the applied field, the dichroic dye (positive dichroic ratio) follows the orientation of the liquid crystal causing the cell to go from a darkened state (off state) to a bleached state (on state). When the voltage is turned off, the liquid crystals and the dichroic dyes in the liquid crystal mixture are reoriented parallel to the polyimide coating making the liquid crystal cell less transparent i.e. darker. U.S. Pat. No. 5,477,358 discusses the manufacture and operation of a liquid crystal cell.

As can be appreciated by those skilled in the art of fabricating liquid crystal cells, it would be advantageous to provide a liquid crystal cell that does not have to use the polyimide layers thereby eliminating the deposition, heat treatment and rubbing of the polyimide layer.

SUMMARY OF THE INVENTION

This invention relates to improved liquid crystal cells and more particularly, to improved electrodes for liquid crystal cells. The liquid crystal cell that is improved by the invention is of the type having a pair of electrodes spaced from one another with the edges of the electrodes sealed to provide a sealed compartment therebetween for containing a liquid mixture. The electrodes that are improved by the invention are of the type having a conductive coating e.g. an ITO coating on a glass substrate and a polyimide layer on the ITO coating. The polyimide layer has a unidirectional rubbed surface with the rubbed surface of the polyimide layers facing one another with the direction of the rubbing opposite to one another. Although not limited to the invention, the liquid mixture as used herein and in the claims may include a nematic liquid crystal and dichroic dye and may further include a chiral liquid crystal component, a chiral component, thermochromic materials and/or photochromic materials of the type including pyrons, oxazines, fulgides and fulgimides. Other photochromic materials which may be used in the practice of the invention are disclosed in U.S. Provisional Application entitled ELECTRO-OPTICAL DEVICE AND VARIABLE TRANSPARENT ARTICLE WITH SUCH DEVICE in the name of C. B. Greenberg. Thermochromic materials which may be used in the practice of the invention are those which exhibit changes in physical properties such as absorption, reflectance and refractive index as the result of temperature changes, as disclosed in U.S. Pat. Nos. 4,028,118 and 4,732,810. Without limiting the invention, dichroic dyes are useful alone in a mixture or in a mixture with photochromic materials as optically active materials mostly because of their ability to absorb light of a particular polarization when they are molecularly aligned within a liquid crystal material. Dichroic dyes that may be used in the practice of the invention, but not limiting thereto, include azo dyes and anthraquinone dyes. Other suitable dichroic dyes for use in the present invention include Congo Red (sodium diphenyl-bis-alpha-naphthylamine sulfonate), methylene blue, stilbene dye (Color Index (CI)=620), and 1,1'-diethyl-2,2'-cyanine chloride (CI=374 (orange) or CI=518 (blue)). The properties of these dyes, and methods of making them, are described in E. H. Land, Colloid Chemistry (1946). These dyes have noticeable dichroism in polyvinyl alcohol and a lesser dichroism in cellulose. Other suitable dyes include those listed with their properties and the methods of making them, discussed in the Kirk Othmer Encyclopedia of Chemical Technology, Vol. 8, pp. 652–661 (4th Ed. 1993), and in the references cited therein.

The improved electrodes of the invention eliminate the need for the polyimide layer. More particularly, the electrodes of the invention have a conductive material deposited on a substrate, the conductive material has the properties of electrical conductivity and orientation and/or alignment of the liquid crystals of the liquid mixture in the compartment. Conductive materials that may be used in the practice of the invention include, but are not limited to, pyrolytically deposited conductive metal oxides e.g. but not limiting to the invention, tin oxide having fluorine, antimony and mixtures thereof of the type disclosed in U.S. Pat. Nos. 4,584,206; 4,900,100 and 5,356,718, and in U.S. patent application Ser. No. 09/521,845 filed on Mar. 9, 2000, in the names of Janos Szanyi et al. and entitled "Methods of Making Low Haze Coatings, and the Coatings and Coated Articles Made Thereby" (discloses Solarban 55 coated glass). The disclosures are hereby incorporated by reference.

The invention further relates to the method of making the improved liquid crystal cell. The method includes the step of providing a substrate having a conductive material, e.g. pyrolytically depositing a tin oxide doped with fluorine and/or antimony. The surface is wiped clean using a cloth saturated with an alcohol solvent. If the wiping is random, the transmitted color of the liquid crystal cell in the darkened state is uniform as viewed by the unaided eyes and shows the random wiping pattern when viewed through a linear polarizer. If the wiping is unidirectional, the transmitted color of the liquid crystal cell in the darkened state is uniform when viewed with the unaided eyes and when viewed through a linear polarizer. A liquid crystal cell is constructed by mounting the electrodes in spaced relation and filling the space with a liquid mixture. The electrodes are seated to provide a sealed compartment containing the liquid mixture and having the electrodes in contact with the liquid mixture. As can be appreciated, the cell may be made of two substrates each having a conductive material or two substrates, only one of which has two interdigital electrodes (in-place switching—{IPS")).

The liquid crystal cells made in accordance to the invention may be used as flat panel displays; air, space, land, above water and below water vehicle transparencies; residential and commercial building transparencies, transparencies for containers and lenses e.g. for eyewear. As can be appreciated, when using the electrode of the invention for eyewear, it is preferred that the electrodes are wiped unidirectionally to go from a darkened polarized state to a bleached non-polarized state.

DESCRIPTION OF THE INVENTION

This invention is directed to improved electrodes for liquid crystal cells. The liquid crystal cell uses an applied AC electrical field across electrode to control the orientation of liquid crystals. Electrochromic cells apply a DC electrical current between electrodes to control the darkening and bleaching of the electrochromic materials.

Figure 1:
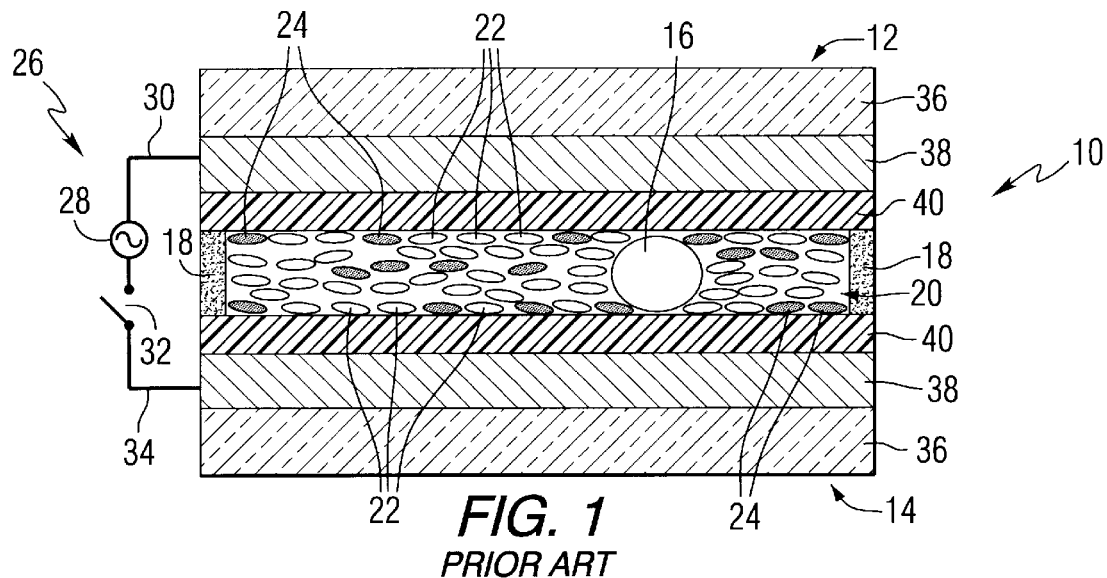
FIG. 1 is a cross sectional view of a prior art liquid crystal cell with no applied electric field across the electrodes.

For an appreciation of the invention a discussion of the presently available liquid crystal cells (prior art) is presented. With reference to FIG. 1 there is shown a liquid crystal cell 10 representative of the prior art. The liquid crystal cell 10 includes a pair of electrodes 12 and 14 maintained in spaced relationship by a plurality of spacers 16 (one only shown in FIG. 1). Edges of the electrodes 12 and 14 (only edges are shown in FIG. 1) are sealed by an epoxy 18 of the type used in the art to seal compartments of liquid crystal cell devices to provide a sealed compartment 20 therebetween. The compartment 20 is filled with a liquid mixture of homogeneously aligned liquid crystals (identified by the numeral 22 in FIGS. 1–3) and dichroic dye molecules (identified by numeral 24 in FIGS. 1–3) of the type used in the art to make nematic guest-host liquid crystal cells. Each of the electrodes 12 and 14 is connected by a circuit 26 which includes a power supply 28 connected at one end to one of the electrodes e.g. electrode 12 by electrical wire 30 and connected at the other end to switch 32. The switch 32 is connected by electrical wire 34 to the other electrode e.g. electrode 14. The switch 32 is provided to "power on" or "power off" the electrode to change the liquid crystal cell from a darkened state (cell in "powered off" state) to a bleached state (cell in "powered on" state) and vice versa. As can be appreciated, the power supply is preferably an AC power supply. A DC power supply may be used in the practice of the invention; however, the use of a DC power supply over time will degrade the liquid crystal cell.

A prior art cell of he type shown in FIG. 1 was fabricated in a laboratory environment. Each of the electrodes 12 and 14 included a glass substrate 36 having an indium tin oxide ("ITO") coating 38 and a polyimide layer 40 adhered to the ITO coating 38. The ITO coating was applied by magnetron sputter vacuum deposition ("MSVD"). The polyimide layer 40 was deposited or applied on the ITO coating by spin coating a liquefied polyimide onto the ITO coating and thereafter heat treating the applied polyimide to polymerize the polyimide to provide a polyimide layer 40 over the ITI coating 38. The electrodes 12 and 14 were, thereafter, positioned side by side with the polyimide layers facing upward. A felt cloth was rubbed over the surface of each of the polyimide layers in one direction i.e. a unidirectional wipe or rub. Each polyimide layer was rubbed in the one direction five times. A mixture of 2-propanol with fiberglass cylindrical shaped rods 8 microns in diameter sold by E. M. Industries Inc. was spin coated onto the rubbed polyimide surface of one of the electrodes.

Thereafter, one of the electrodes was rotated 180 degrees and inverted over the other electrode with the rubbed polyimide surfaces facing one another; the sides of each electrode were aligned with one another and the end of each electrode were off set from one another to provide an area to connect the electrodes 12 and 14 to an AC power supply 28 which is connected to wires 30 and 34 and for each of capillary filling of the compartment. The spacers 16 (one only shown in FIG. 1) maintain the electrodes 12 and 14 in spaced relationship to one another to provide the compartment 20. The sides of the electrodes were sealed with a UV curable epoxy of the type used in the art. The electrodes held in spaced relationship by the epoxy 18 are heated in any usual manner to a temperature above the isotropic temperature of the liquid crystals in the liquid mixture. The liquid crystals used were of the type sold by E. M. Industries catalogue no. E-7. The liquid mixture included the dichroic dye dissolved in the liquid crystals. The liquid mixture was heated to a temperature within the range of 58° to 90° C. The heated compartment was capillary filled with the liquid mixture of liquid crystal and dichroic dye by placing droplets of the liquid mixture along the pair of off set ends of the electrodes which were not sealed. The assembled electrodes are allowed to cool to room temperature and the open ends of the compartment sealed with an epoxy e.g. a five minute cure epoxy of the type used in the art to seal compartment of liquid crystal cells. The liquid mixture when heated is in the isotropic state and upon cooling goes to the homogeneously aligned nematic state (parallel to the rubbed direction) as shown in FIG. 1.

The instant invention includes using electrodes that do not have the polyimide layer. More particularly and with reference to FIGS. 2 and 3 as required, there is shown liquid crystal cell 50 having features of the invention. The liquid crystal cell 50 includes electrodes 52 and 54 maintained in spaced relationship by the spacers 16 (one only shown in FIGS. 2 and 3) with the sides and ends of the electrodes 52 and 54 sealed with the epoxy 18 to provide a sealed compartment 56. The compartment 56, which is similar to the compartment 20 of FIG. 1 is filled with the liquid mixture having the liquid crystals 22 and the dichroic dye molecules 24, e.g. of the type discussed above. For 2 inch (5.08 centimeter "cm") square electrodes it is the usual practice to deposit droplets of the liquid mixture at the open ends e.g., the off set ends of the compartment with the liquid moving into the compartment by capillary action. For electrodes having dimensions greater than 2 inches (5.08 cm) for example 4 inches (10.16 cm) square or greater the arrangement shown in FIG. 4 is recommended for faster filling of the compartment. More particularly, when filling a large compartment e.g. 4 inch (10.16 cm) square or greater on a hot plate, it is important not to let the liquid crystal front move too slowly otherwise air bubbles will form.

With reference to FIG. 4 two adjacent sides 66 and 68 of one electrode 70 are off set from two adjacent sides 72 and 74 of the other electrode 76. Overlaying portions of the electrodes are sealed at 78 with an epoxy of the type used in the art. Droplets of the liquid mixture are applied along the two adjacent sides 68,74 and 66,72 to fill the compartment 80 by capillary action.

As can be appreciated, the invention is not limited to the make up of the liquid mixture; more particularly, in addition to the liquid crystals and the dichroic dye, the liquid mixture may include chiral nematic liquid crystals, chiral components, thermochromic materials, and/or photochromic materials of the type discussed above under Summary of the Invention. Further, the invention is not limited to a liquid mixture; for example, a polymer base liquid crystal system may be used in the practice of the invention.

The electrodes 52 and 54 embodying features of the invention include a substrate 58 having a coating 60 incorporating features of the invention. One of the substrates 58 may be and more often both substrates 58 are made of a transparent material. In the practice of the invention the substrate may be made of any material for example clear, tinted, coated, or photochromic glass; clear, tinted or photochromic plastics; metal, and/or fiberglass reinforced plastics. Further, solar control type glasses, e.g. having low ultraviolet transmission, low total solar energy transmission and low infrared transmission of the type known in the art, may be used in the practice of the invention. Although the invention may be practiced using substrates of any material, the material of the substrates and the epoxy 18 should be selected to provide a liquid tight compartment to contain the liquid mixture in the compartment 60. In the case of a polymer based liquid crystal system, the compartment may not have to be sealed. In the practice of the invention it is preferred to use transparent soda-lime-silica glass, however, the invention contemplates using one electrode made of a soda-lime-silica glass and the other electrode made of a non-transparent substrate. In this instance although not limiting to the invention the non-transparent substrate may have a reflective surface or coating under the coating 60.

In the practice of the invention the coating 60 is a conductive coating and an alignment layer for the liquid crystal. Although not limiting to the invention, the preferred coating is a tin oxide coating which may have a dopant for example fluorine and/or antimony. ITO as shown below may be used when prepared in accordance with the invention as discussed below. The conductive coating e.g. a tin oxide coating may be deposited on the substrate in any convenient manner e.g. but not limiting to the invention, chemical vapor deposition (CVD), physical vapor deposition (PVD), combustion chemical vapor deposition (CCVD), spray pyrolysis, pulsed laser deposition, plasma spray, filtered laser arc, pulsed dc glow discharge, plasma arc deposition, plasma CVD, metal organic CVD, ion assisted deposition, hollow cathode deposition, laser assisted deposition, reactive magnetron sputtering, pulsed reactive magnetron sputtering, pulsed magnetron sputtering, plasma enhanced CVD, electron cyclotron resonance CVD, to name a few. As can now be appreciated, the material of the substrate should be selected such that it is not deteriorated during the deposition or application of the conductive and aligning coating. In the practice of the invention, the preferred substrate material is glass, and the conductive and aligning coating is pyrolytically applied to or coated on the glass substrate. As will be appreciated, the sheet resistivity of the electrode is not limiting to the invention; however, as the area of the electrode contacting the liquid mixture increases, it is desirable to have electrodes with a low sheet resistance. Cells were made having a sheet resistance in the range of 3–127 ohms/sq.

The invention was practiced using soda-lime-silica glass pieces cut from a 3 millimeter thick glass ribbon made by the float process. As the glass ribbon moved through a chamber (not shown) on a molten metal bath the glass ribbon was coated with a low-E coating of the type and manner disclosed in U.S. Pat. No. 5,356,718 which disclosure is hereby incorporated by reference. The coated glass that is of the type sold by PPG Industries, Inc. under its trademark Sungate 500 coated glass has an amorphous mixed $SiO_2$—$SnO_2$ coating layer pyrolytically applied to the glass ribbon and a fluorine doped crystalline tin oxide ($SnO_2$:F) coating layer deposited on the amorphous mixed $SiO_2$—SnO coating. The sheet resistivity of the layer for the Sungate 500 coated glass is about 20 ohms/square and for the Sungate 300 coated glass (a pyrolytically deposited fluorine doped crystalline tin oxide on glass) is about 63 ohms/square. Glass pieces were cut from the ribbon. Some pieces cut from the ribbon were in storage for three years before they were used to make the electrode incorporating features of the invention. The glass sheets were stored with polymeric beads parting medium between the sheets. Reference may be had to U.S. Pat. No. 4,530,889 which disclosure is hereby incorporated by reference for a discussion of the polymeric beads. Although it was initially thought that aging could have an effect on the coating, subsequently made electrodes showed that aging had no noticeable effect on the performance of the coated glass for electrodes in the practice of the invention.

Figure 2:
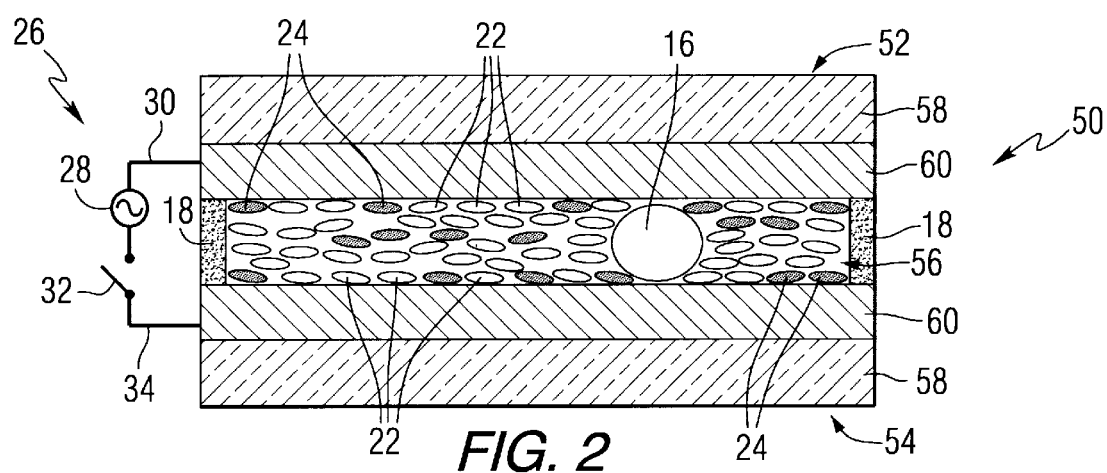
FIG. 2 is a cross sectional view of a liquid crystal cell of the instant invention with no applied electric field across the electrodes.

The following discussion of the making of a sample (initial sample) incorporating features of the invention using glass stored for three years. Two 2" (5.08 cm) square pieces of glass were cut from the glass pieces and were cleaned by spraying the coated surface with a 50:50 v:v 2-propanol: deionized water solution and wiping the coated surface dry with a polyester-cellulose wipe sold under the trademark TechniCloth® by the TEXWIPE Company LLC., wiped dry with a Kimwipe, and wiped five times unidirectionally with a felt cloth wetted with 2-propanol. A liquid crystal cell was constructed in a similar manner as the liquid crystal cell 50 as shown in FIG. 2 except the compartment had dimensions of 2"×1¾" to provide a ¼" extension of each of the electrode on opposite sides of the compartment 60 to provide electrical connection to each of the electrodes. The heated liquid mixture of E7 liquid crystal and 2 weight percent G-472 dichroic dye was prepared and flowed into the heated compartment as previously discussed into direct contact with the tin oxide coating. The compartment was sealed as previously discussed and AC power source connected to the electrodes. When an AC voltage or field of between 2 and 20 volts and 50–60 Hertz was powered on, (see FIG. 3) the luminous transmittance (Lta) was 44% in the bleached state and when the field was powered off (see FIG. 2) the luminous transmittance (Lta) was 26% in the darkened state.

Figure 3:
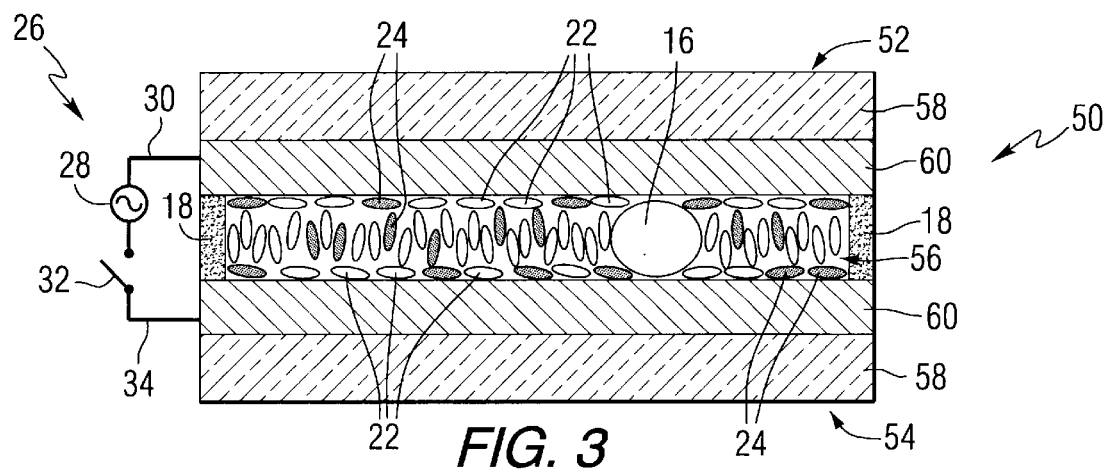
FIG. 3 is a view similar to the view of FIG. 2 with an electric field applied across the electrodes.
Figure 4:
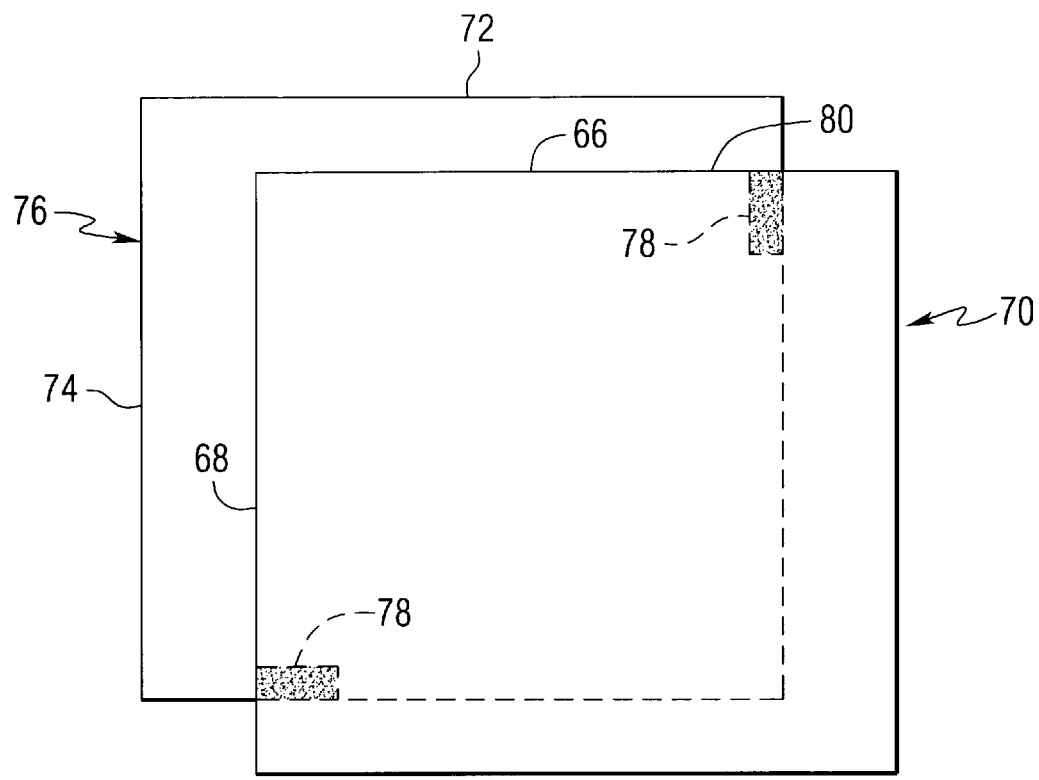
FIG. 4 is a top view of a pair of electrodes mounted in a fixed position relative to one another for capillary filing of the compartment therebetween with a liquid mixture.

Referring to FIG. 3, with the power on, the longitudinal axis of the crystals 22 and dichroic dye 24 were normal to the tin oxide coating except for a thin molecular layer of crystals and dichroic dye which remained with their longitudinal axis parallel to the coating as shown in FIG. 3. When the liquid cell was powered off, the liquid cell was in the unbleached (dark) state and viewed through a linear polarizer, the linear wiping direction of the coating was observed as indicated by the position of the dichroic dye. In the fabrication of an additional liquid cell, the wiping direction during cleaning of the coating was circular. Viewed through a linear polarizer with the cell in the unbleached state the circular wiping direction was indicated by the position of the dichroic dye. From these observations it is believed that the liquid crystals and dichroic dye follow the wiping direction during cleaning of the coating or that most of the contaminants on the coated surface of the crystalline tin oxide coating are removed and the liquid crystal molecules are aligned with the texture of the coating or some combination of these effects.

Table I shows particulars of liquid crystal cells (LCC) Nos. 1–7 made in accordance to the invention using the electrodes of the instant invention. LCC No. 6 was made using a coated glass stored for more than about 10 years and LCC No. 7 was made using coated glass made less than one year. The LCC Nos. 1–3 and 5–7 are nematic guest-host liquid crystal devices and are linear polarizers in the darkened state. LCC Nos. 1–3 and 5–7 performed equivalently; more particularly, the transmitted color in the darkened state was uniform when viewed by the unaided eye or with a linear polarizer. LCC No. 4 is a twisted nematic guest-host liquid crystal cell and is not a linear polarizer in the darkened state. LCC No. 4 performed equivalent to a LCC having the polymide later and twisted nematic guest-host liquid crystal.

TABLE 1

Fabrication Particulars of Liquid Crystal Cell of the Instant Invention

| Liquid Crystal Cells | Electrode Coating On 3 MM Clear Float Glass | Sheet Resistance (Ohm/sq.) | $SnO_2$ X-Ray Diffraction Preferred Orientation | Surface Treatment | Liquid Crystal | Dichroic Dye | Filling | Spacer (mm) | % Lta Change |
|---|---|---|---|---|---|---|---|---|---|
| 1 | Sungate® 500, $SnO_2$:F $SiO_2$—$SnO_2$ Coated Glass | 20 | (110) | Cleaned by spraying with 50:50 v:v 2-propanol:deionized water, and wiping dry with TechniCloth® wiper, then unidirectional-stroked 5× w/cotton pad wetted with 2-propanol, and finally unidirectional-stroked 5× with dry cotton pad. | E7 | G-472 | capillary | 8 | 22 |
| 2 | Sungate® 500, $SnO_2$:F $SiO_2$—$SnO_2$ Coated (Green) Glass | 20 | (200) | Cleaned by spraying with 50:50 v:v 2-propanol:deionized water, and wiping dry with TechniCloth® wiper, then unidirectional-stroked 10× with dry cotton pad. | E7 | G-472 | capillary | 8 | — |
| 3 | Sungate® 500, $SnO_2$:F $SiO_2$—$SnO_2$ Coated (Green) Glass | 20 | (200) | Cleaned by spraying with 50:50 v:v 2-propanol:deionized water, and wiping dry with TechniCloth® wiper, then unidirectional-stroked 10× with dry cotton pad. | E7 | G-472 | capillary 2D | 10 | — |
| 4 | Sungate® 500, $SnO_2$:F $SiO_2$—$SnO_2$ | 20 | (200) | Cleaned by spraying with 50:50 v:v 2-propanol:deionized water, and wiping dry with TechniCloth® wiper, then | 95% E7/5% CB15 | G-202 | capillary | 10 | 31 |

TABLE 1-continued

Fabrication Particulars of Liquid Crystal Cell of the Instant Invention

| Liquid Crystal Cells | Electrode Coating On 3 MM Clear Float Glass | Sheet Resistance (Ohm/sq.) | SnO$_2$ X-Ray Diffraction Preferred Orientation | Surface Treatment | Liquid Crystal | Dichroic Dye | Filling | Spacer (mm) | % Lta Change |
|---|---|---|---|---|---|---|---|---|---|
| 5 | Coated Glass Sungate ® 300, SnO$_2$:F SiO$_2$—SnO$_2$ Coated Glass | 63 | (110) | unidirectional-stroked 10× with dry cotton pad. Cleaned by spraying with 50:50 v:v 2-propanol:deionized water, and wiping dry with TechniCloth ® wiper, then unidirectional-stroked 10× with dry cotton pad. | E7 | G-472 | capillary | 8 | — |
| 6 | Sungate ® 200, SnO$_2$:F Coated Glass | 40 | (110) | Cleaned by spraying with 50:50 v:v 2-propanol:deionized water, and wiping dry with TechniCloth ® wiper, then unidirectional-stroked 10× with dry cotton pad. | E7 | G-472 | capillary | 8 | — |
| 7 | SnO$_2$:Sb coating on glass | 125 | (110) | Cleaned by spraying with 50:50 v:v 2-propanol:deionized water, and wiping dry with TechniCloth ® wiper, then unidirectional-stroked 10× with dry cotton pad. | E7 | G-472 (Nippon 95-1), 1.0% | capillary | 8 | — |

NOTE 1: CB15 is a chiral molecule obtained from E. M. Industries. The percentages are weight percent of total weight of the liquid mixture.
NOTE 2: G-472 is a blue dichroic dye and G-202 is a purple dichroic dye, each obtained from Nippon Kankoh Shikiro Kenkyusho of Okayama, Japan. The dyes were 1 weight percent of the total weight of liquid mixture.
NOTE 3: All compartments of the samples except as noted below were filled by sealing a pair of opposite sides and filling the compartment (capillary filling), thereafter, sealing the remaining sides of the compartment. Sample 3 was filled by offsetting the plates to provide a 1¾" square compartment. Two adjacent sides were left open for receiving the liquid mixture and portions of the adjacent sides were sealed. The liquid mixture flowed through the compartment and out the opposite corner. (see FIG. 4)

LCC No. 3—device was filled from two adjoining edges simultaneously,. Device was then cooled, but not powered. Device was then reheated to isotropic state and powered with 24 VAC while cooling to nematic state. After cooling to room temperature, device was powered. Device performed the same as that made with one-directional filling.
LCC No. 4—Upon cooling to nematic state, liquid crystal-dye mixture took on an hazy appearance. However, when device is on (bleached) device is not hazy. Very slight lightening and darkening when viewed with polarizer rotated back and forth 90°—acting as a natural polarizer.
LCC No. 5—Device performs similarly to device of LCC Nos. 1–4.
LCC No. 6—Observed marks form cleaning when observed with a linear polarizer and the darkened state appeared uniform when viewed with the unaided eye. The marks could be a result of surface damage as a result of the storage and handling during the storage period, and the surface damage could not be totally removed by cleaning thereafter; device performs similarly to devices of LCC Nos. 1–4.
LCC No. 7—Device performs similarly to LCC 1–4.

With reference to Table 2, LCC No. 8 is representative of the prior art. LCC No. 9 was cleaned but not rubbed and appeared similar to the LCC No. 8 when viewed with the unaided eye. That is they were uniformly dark in the off state (no applied voltage) and uniformly bleached in the on state (voltage between 2 to 20 volts, 50–60 Hertz). However, when viewed through a linear polarizer in the off state, the light was not completely blocked for any orientation of the linear polarizer. Instead, a light and dark pattern was observed as the linear polarizer was rotated which was similar to how the surface was rubbed clean. These observations indicate that the liquid crystal and dichroic dye are aligned parallel to the glass surface but are not aligned unidirectionally in any one direction, and thus is the device is not a linear polarizer. A linear polarizer was obtained with LCC No. 10 which was unidirectionally wiped clean but not unidirectionally rubbed. The alignment of the liquid crystal and dye was further improved by rubbing ten times with a dry cotton cloth or velvet (see LCC No. 11). LCC No. 11 appeared uniform to the unaided eye and was an improved linear polarizer compared to LCC No. 10.

It is clear from Table 2 and the following discussion that the cleaning method affects how the liquid crystal molecules align on a surface.

LCC Nos. 12 and 13 were plasma cleaned. LCC No. 12 was not unidirectionally rubbed after the plasma treatment and was an acceptable linear polarizer. LCC No. 13 which was plasma treated and unidirectionally rubbed was an improved linear polarizer compared to LCC No. 12. LCC Nos. 14 and 15 were ultrasonically cleaned. LCC No. 14 was not unidirectionally rubbed and was a poor linear polarizer, when LCC No. 15 was ultrasonically cleaned and unidirectionally rubbed it was a linear polarizer. Based on LCC Nos. 9–15, it is concluded that unidirectional rubbing after a cleaning process gives the better linear polarizer.

LCC No. 16, which was cleaned by wiping with solvents followed by unidirectional rubbing, did not appear uniform in color to the unaided eye; random areas of parallel and homeotropic alignment were observed. LCC No. 17, which was ultrasonically cleaned but not rubbed, looked like LCC No. 16. LCC No. 18, which was ultrasonically cleaned and then unidirectionally rubbed, appeared uniform in color to the unaided eye and acted as a linear polarizer. From the above, it concluded that it is possible to obtain homogeneous alignment without the polyimide layer, even with ITO glass when cleaned ultrasonically in a detergent bath.

TABLE 2

Comparison of Guest-Host Devices Made With and Without A Polyimide Layer

| Liquid Crystal Cell | Sample ID | Electrode Surface | Glass Cleaning | Unidirectional Rubbing ↓ | Observation in the Darkened State Viewed in Transmission | | LC Alignment w/r to Surface |
|---|---|---|---|---|---|---|---|
| | | | | | Unaided eye | w/polarizer ⇆ | |
| 8 | ITO-1 | Sputter Coated ITO with polyimide alignment layer[1] | Random wipe w/solvent before polyimide coating[2] | Yes (the polyimide layer) | Uniform color | Uniform color | homogeneous |
| 9 | SG500-1 | Coated with Interleaving[3] | Random Wipe w/solvent[2] | No | Uniform color | Light and dark pattern observed | parallel & not unidirectional |
| 10 | SG500-2 | Same as SG500-1 | Unidirectional Wipe w/solvent[4] | No | Uniform color | Uniform color | homogeneous |
| 11 | SG500-3 | Same as SG500-1 | Random Wipe w/solvent[2] | Yes | Uniform color | Uniform color | homogeneous |
| 12 | SG500-4 | No interleaving | Plasma[5] | No | Uniform color | Uniform color not as uniform as LCC #8 | parallel & randomly oriented on a macroscale |
| 13 | SG500-5 | Same as SG500-4 | Plasma[5] | Yes | Uniform color | Uniform color | homogeneous |
| 14 | SG500-6 | Same as SG500-4 | Ultrasonic[6] | No | Uniform color | Uniform color not as uniform as LCC #8 | parallel & randomly oriented on a macroscale |
| 15 | SG500-7 | Same as SG500-4 | Ultrasonic[6] | Yes | Uniform color | Uniform color | homogeneous |
| 16 | ITO-2 | Supplier coated ITO[7] | Random Wipe w/solvent[2] | Yes | alignment of edge with wiping direction | not uniform in color | random areas of parallel and homeotropic |
| 17 | ITO-3 | Same as ITO-2 | Ultrasonic[6] | No | alignment of edge with wiping direction | not uniform in color | random areas of parallel and homeotropic |
| 18 | ITO-4 | Same as ITO-2 | Ultrasonic[6] | Yes | Uniform color | Uniform color | homogeneous |

NOTE 1: Electrodes obtained from Liquid Crystal Institute of Kent State University.
NOTE 2: Random wipe with solvent: First spray substrate with 2-propanol, acetone, or 1:1 volume ratio of 2-propanol: deionized (DI) water, and then wipe dry with a Kimwipes ® or TechniCloth ® wiper. Then randomly wipe substrate with a Kimwipes ® wiper wetted with 2-propanol or acetone.
NOTE 3: Glass pieces stored with interleaving material to separate adjacent glass surfaces.
NOTE 4: Unidirectional wipe with solvent: First spray substrate with 1:1 volume ratio of 2-propanol: (DI) water, and wipe dry with a Kimwipes ® or TechniCloth ® wiper. Then unidirectionally wipe substrate with a velvet cloth saturated with 2-propanol or acetone.
NOTE 5: Plasma: First, flush substrate with DI water, and then blow dry with nitrogen. Next, expose the sample to an oxygen plasma for 20 minutes in a SPI ® Supplies Plasma Prep II unit.
NOTE 6: Ultrasonic: First, flush sample with DI water. Then ultrasonically clean in an aqueous detergent bath (Dart 210, pH 2.9, 50° C.) for 20 minutes. Finally, rinse with DI water, and blow dry with nitrogen.
NOTE 7: Prepared by PPG Industries, Inc.
NOTE 8: The liquid crystal mixture for the LCC Nos. 8–18 was E-7 with blue dichroic dye G472.

Table 3 shows various types of applied conductive layers on a glass substrate having a range of sheet resistance (3–127 ohms per square), and different surface treatments incorporating features of the invention that result in acceptable nematic guest-host liquid crystal cell devices which in the darkened state are acceptable linear polarizers. Further Table 3 shows that in general a greater % transmittance of the electrodes results in a greater change in luminous transmittance from the darkened stage to the bleached stage (see LCC Nos. 22 and 24).

Figure 5:
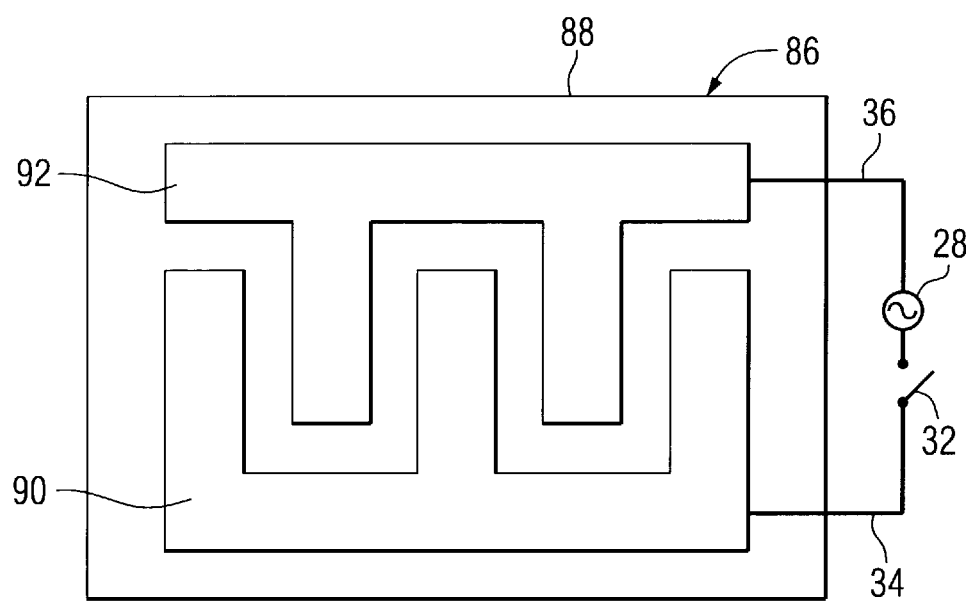
FIG. 5 is top view of a substrate having two interdigital electrodes that may be used in the practice of the invention.

As can be appreciated, the invention is not limited to the design of the electrode or the number of conductive substrates used. For example and with reference to FIG. 5, there is shown conductive substrate 86 having a substrate 88 and two interdigital electrodes 90 and 92 connected to the power supply 28 as previously discussed. Although two interdigital electrodes are shown in FIG. 5, the invention contemplates having more than two electrodes on one surface

TABLE 3

The effect of using different pairs of electrodes on the $\Delta LT_a$ of cells with the following structure: electrode/liquid crystal + dye/electrode

| Liquid Crystal Cell | Electrodes | Sheet Resistance (ohm/sq) | Surface Treatment* | $LT_a$ of one electrode | $\Delta LT_{a(12V-0V)}$ of device | Coating type | Conductive layer |
|---|---|---|---|---|---|---|---|
| 19 | SUNGATE ® 500 glass | 20 | A | 83.1 | 21.6 | CVD | $SnO_2$:F |
| 20 | SUNGATE ® 1000 glass | 3 | B | 78.8 | 15.3 | MSVD | Ag |

TABLE 3-continued

The effect of using different pairs of electrodes on the $\Delta LT_a$ of cells with the following structure:
electrode/liquid crystal + dye/electrode

| Liquid Crystal Cell | Electrodes | Sheet Resistance (ohm/sq) | Surface Treatment* | $LT_a$ of one electrode | $\Delta LT_{a(12V-0V)}$ of device | Coating type | Conductive layer |
|---|---|---|---|---|---|---|---|
| 21 | SUNGATE ® 100N glass | 6 | B | 83.6 | 16.7 | MSVD | Ag |
| 22 | SUNGATE ® 200 glass | 40 | A | 85.3 | 22.6 | PPS[1] | $SnO_2$:F |
| 23 | SUNGATE ® 300 glass | 44 | A | 84.8 | 22.5 | CVD | $SnO_2$:F |
| 24 | SOLARBAN ® 55 glass | 127 | A | 51.5 | 10.2 | CVD | $SnO_2$:Sb |

A) Spray with 1:1 volume ratio of 2-propanol:DI water, and wipe dry with TechniCloth ® wiper (TEXWIPE ®). Unidirectionally rub 10x with cotton pad.
B) Rinse with DI water, and follow with 20 minutes of ultrasonic cleaning in pH 2.9 Dart 210 detergent solution heated to 40° C. Then rinse with DI water, and blow dry with house nitrogen. Unidirectionally rub 10x with synthetic velvet.
NOTE 1: pyrolysis powder spray
SUNGATE 1000 is a glass substrate having an MSVD coating having two silver layers separated by dielectric films.
SUNGATE 100N is a glass substrate having an MSVD coating having one silver layer and a dielectric film on each side.
SUNGATE 200 is a pyrolytically coated glass substrate having a fluorine doped tin oxide on one surface and a reflective film on the other surface.
SOLARBAN 55 glass is a glass having pyrolytically deposited antimony doped tin oxide.
SUNGATE and SOLARBAN are trademarks registered by PPG Industries Ohio, Inc. and are products sold by PPG Industries, Inc.

As can be appreciated the invention is not limited by the illustrations presented and are only limited by the following claims.

What is claimed is:

1. A liquid crystal cell comprising:

a sealed compartment;

a liquid mixture in the compartment, the liquid mixture comprising a liquid crystal and a dichroic dye;

a pair of electrodes having surface portions of the electrodes contacting the liquid mixture wherein the surface portions of the electrodes contacting the liquid mixture are both conducting and aligning surfaces comprising a tin oxide coating having a dopant material selected from the group consisting of fluorine, antimony, and mixtures thereof, wherein alignment of the liquid crystals by the surface portions of the electrodes contacting the liquid mixture is observed by viewing the liquid mixture in an unbleached state through a linear polarizer with the position of the dichroic dye showing homogeneous alignment and direction of the liquid crystals, and wherein at least one of the electrodes includes a gradient, mixed metal oxide of silicon oxide and tin oxide between the tin oxide coating and the substrate having a wt % of the silicon oxide that increases as the distance from the substrate decreases and a wt % of the tin oxide that decreases as the distance from the tin oxide coating increases.

2. The cell according to claim 1 wherein the sealed compartment comprises a pair of spaced glass substrates having portions of spaced adjacent surfaces of the substrates joined together to provide the sealed compartment and the dopant material is fluorine.

3. The cell according to claim 2 wherein one of the electrodes is supported by one of the glass substrates and the other electrode is supported by the other glass substrate.

4. The cell according to claim 3 wherein the electrodes are a pyrolytic coating.

5. The cell according to claim 1 wherein the sealed compartment includes at least one glass substrate and the pair of electrodes are two discrete and electrically isolated conducting areas on the at least one glass substrate.

6. The cell according to claim 1 wherein each of the electrodes comprise a coating stack having a silver layer between dielectric layers.

7. The cell according to claim 5 further including a primer layer between the silver layer and one of the dielectric layers.

8. The cell according to claim 7 wherein the coating is a sputter deposited coating.

9. The cell according to claim 1 wherein the dopant material is antimony.

10. The cell according to claim 1 wherein the dopant is a mixture of antimony and fluorine.

11. The cell according to claim 1 wherein the electrodes are a crystalline coating and the surface of the coating contacting the liquid mixture is a unidirectionally rubbed surface as referenced by the homogenous alignment and direction of the liquid crystals as indicated by the position of the dichroic dye.

12. The cell according to claim 1 wherein the sealed chamber includes a plastic substrate and the pair of electrodes comprise an ITO coating.

13. The cell according to claim 1 further comprising an AC voltage supply connected to the electrodes.

14. The cell according to claim 1 wherein the tin oxide coating and the mixed metal oxide layer are a pyrolytic coating and a pyrolytic mixed metal oxide layer, respectively.

15. The cell according to claim 1 wherein the aligning surface aligns the liquid crystals in a circular arrangement.

16. The cell according to claim 1 wherein the enclosure comprises a first plate having a major surface and a second plate having a major surface with the major surface of the plates facing one another, the first plate having the viewing area, wherein one of the electrodes is mounted on the major surface of the first plate and the other electrode is mounted on the major surface of the second plate and portion of each of the pair of electrode electrically accessible from outside the sealed chamber, and further comprising an AC voltage supply connected to the pair of electrodes wherein with the AC supply in the off position the cell has a light transmission defined as a first light transmission and with the AC supply in the on position the cell has a light transmission defined as a second light transmission wherein the first light transmission is different than the second light transmission.

17. The cell according to claim 16 wherein the plates are glass plates.

* * * * *